United States Patent [19]

Yamada

[11] 4,021,698

[45] May 3, 1977

[54] CONTROL DEVICE FOR AUTOMATICALLY CONTROLLING THE QUANTITY OF LIGHT FROM FLASH APPARATUS

[75] Inventor: Seiji Yamada, Sakai, Japan

[73] Assignee: Minolta Camera Kabushiki Kaisha, Osaka, Japan

[22] Filed: Feb. 13, 1976

[21] Appl. No.: 658,061

[30] Foreign Application Priority Data

Mar. 3, 1975 Japan .................................. 50-26301

[52] U.S. Cl. ............................ 315/241 P; 315/151; 315/155; 354/31; 354/34
[51] Int. Cl.$^2$ ......................................... H05B 41/32
[58] Field of Search ............... 315/155, 151, 241 P; 250/214 P, 214 SF, 209; 354/31, 33, 34, 145

[56] References Cited

UNITED STATES PATENTS

| | | | |
|---|---|---|---|
| 2,622,229 | 12/1952 | Lord | 315/152 |
| 3,033,988 | 5/1962 | Edgerton | 250/205 |
| 3,122,677 | 2/1964 | Flieder | 315/241 |
| 3,350,603 | 10/1967 | Erickson | 315/151 |
| 3,440,938 | 4/1969 | Stimson et al. | 354/31 X |
| 3,758,817 | 9/1973 | Elliott | 315/151 |
| 3,906,516 | 9/1975 | Harvey | 354/31 X |

*Primary Examiner*—Eugene R. La Roche
*Attorney, Agent, or Firm*—Watson, Cole, Grindle & Watson

[57] ABSTRACT

In an automatic control apparatus for controlling the quantity of light from a flash device, a first photocell device, responsive to the light from the flash device, is serially connected with a second photocell device, responsive to light reflected from the photographic object, and the output from the second photocell device is integrated and used for energizing known apparatus for preventing the light generated by the flash device from reaching the photographic object to optimize the light illuminating the photographic object. The second photocell device has a lower output than the first photocell device, thereby enabling the output from the second photocell device to determine the light measurement. The first photocell functions as a gate in response to the direct light emission from the flash device to prevent spurious and undesirable actuation of the second photocell device.

The first and second photocell devices may each be phototransistors or photodiodes. A switching means may be connected in parallel with the second photocell device and actuated by the manual operation such that when the switch is closed the second photocell is deactuated, thereby enabling the flash device to operate in accordance with the manual operation. The light measuring means may be energized by a separate power source or by a regulated power source connected to the power source providing energy for the flash device.

18 Claims, 6 Drawing Figures

CONTROL DEVICE FOR AUTOMATICALLY CONTROLLING THE QUANTITY OF LIGHT FROM FLASH APPARATUS

This invention relates to automatic control devices for controlling the quantity of light from flash apparatus, and particularly to such devices that measure the light reflected from the photographic object only in response to light emitted from the flash apparatus to optimize the quantity of light emitted by terminating the energization of the flash apparatus when the quantity of measured light reaches a predetermined level.

BACKGROUND OF THE INVENTION

Prior art automatic control devices for controlling the quantity of light emitted from a flash tube or flash lamp are shown in FIGS. 1 to 4. The device shown in FIG. 1 is that illustrated in the Figure of U.S. Pat. Re. 26,999 and comprises flash tube circuit A, including flash tube 12 adapted to illuminate the photographic object; light terminating circuit B for terminating the light produced by the flash tube; light measuring circuit C adapted to generate a signal in response to the light reflected from the photographic object; and gating means D for enabling the signal from light measuring circuit C to be input to light terminating circuit B upon excitation of flash tube 12. More specifically, gating means D is intermediate light measuring circuit C and light terminating circuit B. The gating means consists of light activated silicon controlled rectifier (LASCR) 14, which responds to the light being emitted from flash tube 12; and transistor 16 which is adapted to be turned on by means of an electrical signal from light measuring circuit C. In light measuring circuit C, photocell 24 and slidewire resistor 26 constitute the initial detecting circuit for light reflected from the object to be photographed. According to the description in the aforesaid patent, the fast conductivity characteristics of certain light sensitive semi-conductor elements are used such that photocell 24 in and of itself effectively integrates the incident light and converts it into a voltage signal of increasing magnitude appearing at slider 26. The signal at slidewire 26 is amplified by transistors 22, 16. Also, zener diode 18 is responsive to the output of transistor 16 and triggers silicon controlled rectifier (SCR) 20, which, in turn, actuates the remainder of light terminating circuit B. As stated in Re. 26,999, zener diode 18 is necessary because its triggering characteristics are much more accurately controllable than those of SCR 20, which is also necessary because of its power handling capabilities. The sudden conductiveness of SCR 20 short circuits resistor 28 to discharge capacitor 30 causing a trigger pulse to be applied to quench tube 32.

In the aforementioned prior art circuit the use of LASCR 14 coupled with transistor 16, the combination of zener diode 18 and SCR 20, as well as amplifying transistors 22, 16, is unnecessarily complex and the extra components and labor to assemble it results in increased costs in its manufacture. The inventors of the subject application have found that results similar to that obtained by the aforementioned prior art circuit are obtainable with less components, thereby resulting in a less complex circuit and lower maufacturing costs.

Another similar type prior art automatic control device for controlling the quantity of light emitted from a flash tube is disclosed in U.S. Pat. No. 3,517,255 and the automatic light termination circuit of the Figure of that patent is shown in FIG. 2. That circuit comprises flash tube circuit A2, with flash tube 40; light terminating circuit B2 for terminating the energization of flash tube 40; light measuring circuit C2 for receiving the light reflected from a photographic object and generating a signal in response thereto; and resetting switch transistor 42 for enabling a signal from light measuring circuit C2 to be input to light terminating circuit B2 coincidentally with the activation of flash tube 40. Resetting switch transistor 42 is conductive with capacitor 44 charged to energize flash tube 40 and switch 44 open. When switch 44 is closed, flash tube 40 is actuated through capacitor 46, trigger transformer 48, and trigger electrode 50. The closing of switch 44 also lowers the potential at junction 49 which then causes resetting switch transistor 42 to be non-conductive, thereby removing the short circuit across capacitor 51 in the gate circuit of LASCR 52. LASCR 52 measures the light reflected from the photographic object, and capacitor 51 charges the photocurrent generated by LASCR 52. When the voltage of capacitor 51 exceeds the gate trigger voltage of LASCR 52, the latter switches to a conductive state. The conduction of LASCR 52 short circuits resistor 54 to effectively connect the voltage of capacitor 56 across winding 58 of quench trigger transformer 60. Thereby, a trigger pulse is applied to quench tube 62, which fires to short circuit flash tube 40.

However, any chattering of switch 44 during its initial operation may result in a corresponding off-on operation of resetting switch transistor 42, thereby causing an inaccurate actuation of light terminating circuit B2, with the result that flash tube 40 is extinguished before an optimum quantity of light has been emitted. Moreover, the automatic light termination circuit of U.S. Pat. No. 3,517,255 requires resetting switch transistor 42 to control the operation of capacitor 51 and LASCR 52 and actuate light terminating circuit B2.

The following is a description of the circuitry illustrated in FIG. 1 of U.S. Pat. No. 3,519,879, which is similar to that of U.S. Pat. No. 3,517,225, and shown herein as FIG. 3. Flash tube circuit A3, light terminating circuit B3 and light measuring circuit C3 correspond to the same lettered circuits previously described. Tubes 66, 68, and LASCR 64 are not conductive with capacitor 70 charged to its normal operating charge for energizing flash tube 66. The voltage between conductors 72 and 73 provides a base bias on gating transistor 74 to make that transistor conductive, whereby its collector-emitter path effectively short circuits capacitor 76 and resistor 78. The gate of LASCR 64 is thereby held non-conductive and prevented from being actuated by extraneous causes to prevent premature firing of quench tube 68.

Flash tube 66 is fired by the closing of switch 80, which causes the voltage between junction 82 and conductor 73 to drop to zero, removing the base bias from gating transistor 74 to make that transistor non-conductive, and causing the gate of LASCR 64 to be unclamped. Coincident with the aforedescribed operation, light from the photographic object is received by LASCR 64 which causes it to generate a photocurrent proportional to the intensity of the incident light. The photocurrent flows through integration capacitor 76 and anticipation resistor 78. The sum of the integrated voltage of capacitor 76 and the anticipation voltage across resistor 78 effectively appears as a control voltage between the gate and cathode of LASCR 64, in series with the voltage across the lower portion of resistor 84 and across capacitor 86. The increasing control voltage resulting from the light impinging on LASCR 64 eventually exceeds the gate trigger voltage thereof to turn LASCR 64 on, which effectively short circuits resistor 88, thereby dumping the charge on capacitor 90 across winding 92 of quench trigger transformer 94. The resulting light terminating trigger pulse actuates tube 68 to short circuit flash tube 66 thereby terminating the production of light. Diode 96 is necessary to effectively connect the anode-cathode path of LASCR 64 across resistor 88, and capacitor 98 reduces the tendency of LASCR 64 to be triggered into conduction by noise. The circuitry for firing flash tube 66 is conventional.

The firing circuits of FIGS. 1 and 3 of the aforesaid patent are similar, except that the firing circuit of FIG. 3 includes a transformer 100, having a primary winding 102 and secondary winding 104, as illustrated in FIG. 4 herein. Winding 102 is connected between flash tube electrode 104 and conductor 106, such that winding 102 is connected in a series with flash tube 108 between conductors 110 and 106. The gating circuit includes SCR 112, the anode of which is connected to junction 114. The anode of LASCR 64 is connected to the cathode of SCR 112 and the gate of SCR 112 is connected through resistor 118 and rectifier diode 120 to one end of transformer winding 104, the other end of the latter being connected to the cathode of SCR 112. Filter capacitor 122 is connected across the series combination of diode 120 and winding 104, whereby the gate-cathode junction of SCR 112 is connected across the output of the aforementioned filter rectifier circuit which is energized from transformer winding 104.

Prior to the closure of switch 80, flash tube 66 is non-conducting, whereby no current flows through winding 102. Consequently, there is no voltage produced across winding 104 and no voltage applied to the gate-cathode junction of SCR 112, whereby it is non-conductive and LASCR 64 is thereby disabled. Subsequent closure of switch 80 fires flash tube 66, and the large discharge current flowing through the tube also flows through winding 102, which produces a voltage pulse across winding 104 that is rectified by diode 120, filtered by capacitor 122 and applied to the gate-cathode junction of SCR 112. Thus, SCR 112 is made conductive, thereby enabling LASCR 64. The ends of winding 104 are points between which a significant change in voltage occurs and therefore corresponds to the changing voltage between conductors 72 and 73 of the embodiment shown in FIG. 1 of the same patent. SCR 112 is kept conducting for the duration of the flash by appropriate selection of the time constant of capacitor 122 and resistor 120. Subsequent to the termination of the flash, SCR 112 is made non-conductive and LASCR 64 is again disabled, such that SCR 112 performs a gating operation similar to that performed by transistor 74 of the embodiment disclosed in FIG. 1 of the subject patent. The remainder of the control circuitry for LASCR 64, as well as the light terminating circuit B3 are the same as FIG. 1 of the patent.

The inventors of the present invention have discovered that similar results can be obtained by using a different technique that reduces the number of components and complexity of the gating control circuitry disclosed in FIG. 1-3 of U.S. Pat. No. 3,519,879, with a commensurate reduction in manufacturing costs.

SUMMARY OF THE INVENTION

The present invention utilizes a conventional flash trigger circuit to actuate an electronic flash device for the production of light onto a photographic object and a conventional light terminating circuit including a quench tube connected in parallel with the electronic flash device to short-circuit the latter for terminating the light emission in response to a control signal generated by the automatic control circuit of the present invention. The control signal is only generated in response to the direct light emission from the flash device of the same camera. The light from the flash device is terminated when the optimum quantity of light has been reflected from the photographic object because the control signal is generated from the integrated measured value of the reflected light.

The automatic control circuit in accordance with the invention uses the characteristics of two photocell devices, or equivalent devices, serially connected with one another, one of the photocell devices being responsive only to the light emitted from the electronic flash device, and the other photocell device being responsive only to the light reflected from the object. The series connected photocell devices are connected to an integrating capacitor, which integrates only the current generated by that photocell responsive to the light reflected from the photographic object, to actuate a SCR, or equivalent device, which in turn, initiates the generation of a trigger pulse to actuate the quench tube.

An important feature of the present invention is that the photocell device responsive only to the light reflected from the photographic object has a lower current or signal output than the photocell device responsive only to the light emitted by the electronic flash apparatus. In this manner, the photocell device responsive only to the light reflected from the photographic object is able to control the current output from the series connected photocells. Thereby, the current integrated by the integrating capacitor is representative of the light conditions at the photographic object, and the integrated current can be used to optimally terminate the light emitted from the electronic flash device before it would normally be extinguished by the discharge of its energization capacitor. Devices other than photocells, such as phototransistors or photoconductive devices may be substituted for the photocell devices.

OBJECTS OF THE INVENTION

It is a primary object of the invention to provide less complex automatic control devices of the type specified herein to obtain such devices at lower costs than prior art devices of a similar type.

It is a further object of the invention to provide a light measuring means for flash terminating devices of the type specified herein utilizing a single gate element responsive to the light output from a flash device and a single element responsive to the light reflected from a photographic object to generate a signal for optimally controlling the light radiated from a flash device to a photographic object.

It is yet a further object of the invention to simplify the light measuring circuitry in flash terminating circuitry of the type specified herein while providing optimum exposure control of a camera.

It is still a further object of the invention to utilize the higher output characteristics of a first photocell device responsive to the light eminating from a flash device as a gating element to actuate a second photocell device having lower output characteristics than the first photocell device for measuring the light reflected from a photographic object and to integrate the output from the second photocell device to obtain a signal capable of actuating switching circuitry for terminating the energization of the flash device.

BRIEF DESCRIPTION OF THE DRAWINGS

FIGS. 1 to 4 are illustrations of prior art control systems for terminating the discharge of a flash device, wherein FIG. 1 is the sole Figure of the control apparatus of U.S. Pat. Re. 26,999;

FIG. 2 is the sole Figure of the control apparatus of U.S. Pat. No. 3,517,255;

FIG. 3 is the control circuit of FIG. 1 of U.S. Pat. No. 3,519,879; and,

FIG. 4 is FIG. 3 of the same patent;

DETAILED DESCRIPTION

Figure 1:
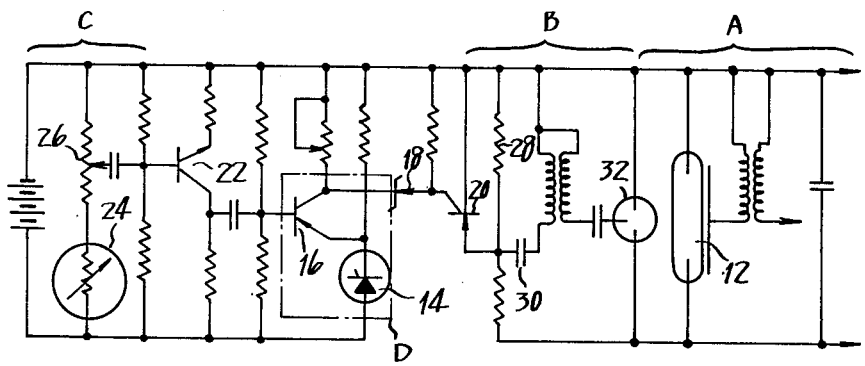
Figure 2:
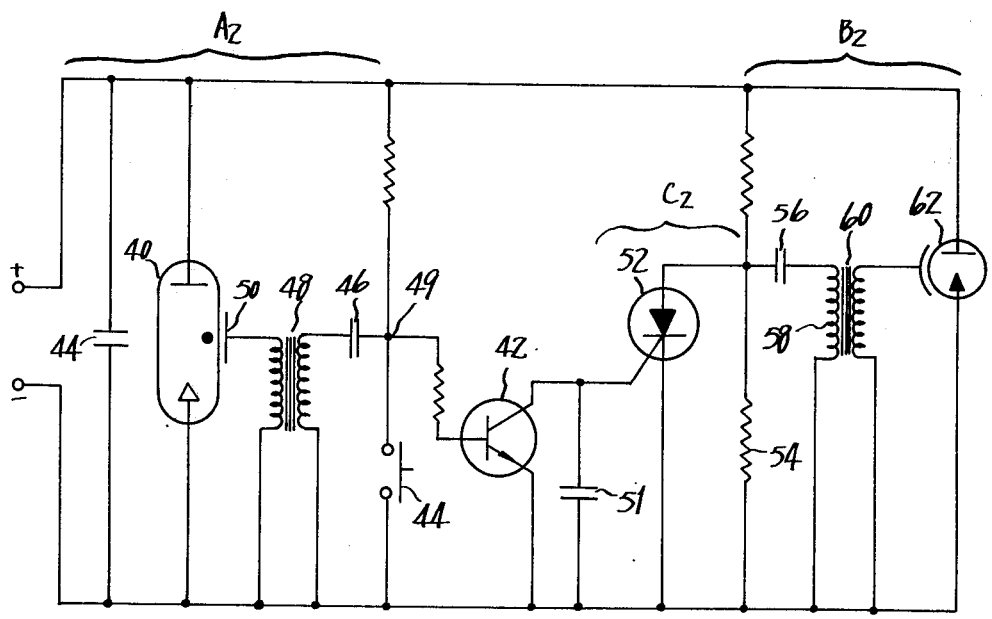
Figure 3:
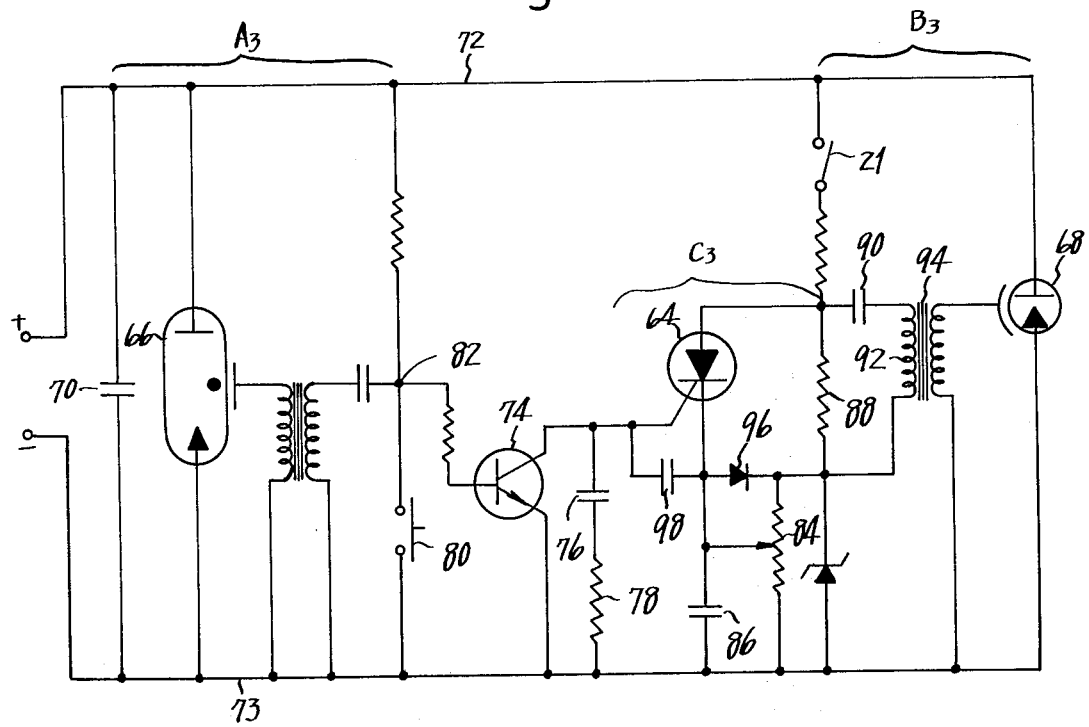
Figure 4:
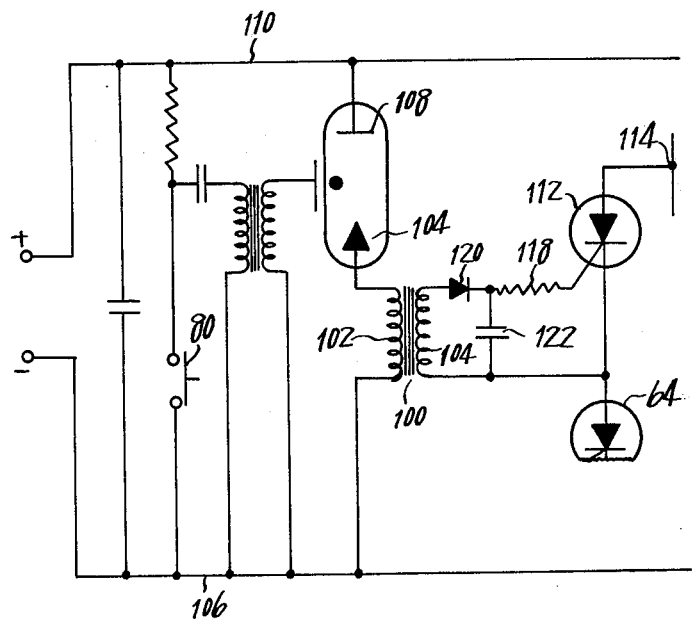
Figure 5:
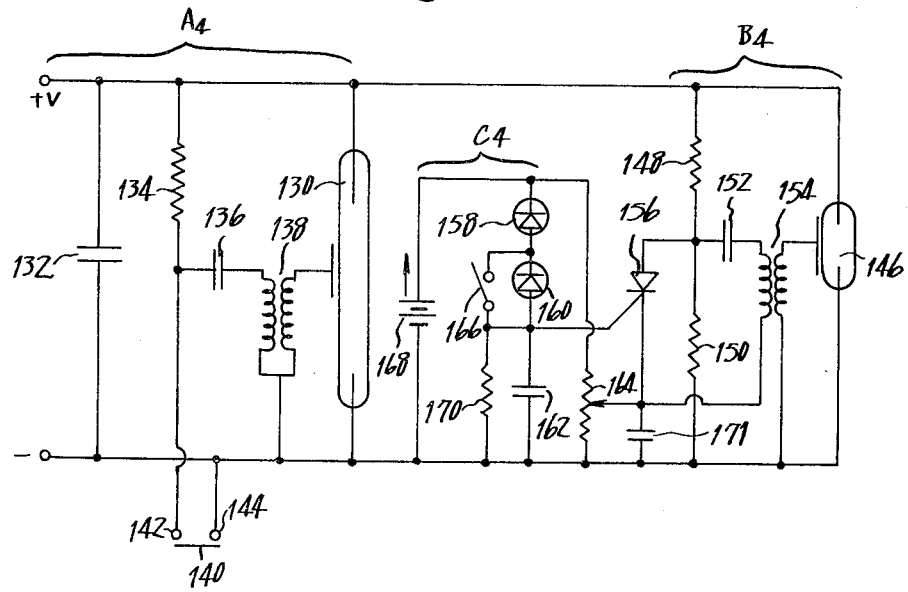
FIG. 5 is an illustrative embodiment of the automatic control circuitry for terminating energization of a flash apparatus in accordance with the present invention.

Referring to FIG. 5, conventional flash tube circuit A4 consists of flash tube 130 for illuminating a photographic object and main capacitor 132 for storing the electrical energy required for actuating the flash tube, a trigger circuit for firing the flash tube including resistor 134, capacitor 136 and coil 138. Contact switch 140, mounted on the camera body, has terminals 142, 144 thereof connected to a high voltage potential source (not shown). Light terminating circuit B4 terminates the energization of flash tube 130, and consists of bypass tube 146 and a trigger circuit consisting of resistors 148, 150, capacitor 152, transformer 154 and thyristor or SCR 156. Bypass tube 146 has a much lower internal impedance than flash tube 130, so that when bypass tube 146 is triggered, the charge on capacitor 152 is discharged through bypass tube 146, thereby terminating the energization of flash tube 130.

It is understood that there are conventional techniques other than that described above for terminating the energization of a flash device such as a flash tube. For example, a mechanical or electrical switching element may be connected in series with flash tube 130, so that the energization of the flash tube is terminated by opening the switching element. Further any light terminating apparatus may be employed that effectively prevents light emission from the flash tube from impinging on the photographic object, such as shutter-type mechanisms. Such light terminating apparatus is adaptable by those skilled in the art to respond to an electrical signal generated by the automatic control circuitry of the present invention to accurately impede light radiation from the flash tube to the photographic object.

An embodiment of a light measuring circuit C4, which receives light reflected from a photographic object, and actuates light terminating circuit B4 when an optimum quantity of light has been received and is actuated only in response to light from the flash tube 130, is shown in FIG. 5. In accordance with one embodiment of the invention, light measuring circuit C4 consists of a series connection of a gating element and a light measuring element, such as photocell devices 158, 160. For the purpose of the following description photocell device 158 is responsive only to the light emitted from the flash device and photocell 160 is responsive only to light reflected from the photographic object. The respective functions of the two photocell devices 158, 160, as well as their positions may be interchanged.

Generally in the circuit where photocells such as photodiodes or phototransistors are connected in series, the quantity of photocurrent flowing through this series circuit is determined to be the least of the photocurrents generated in each photocell. This invention utilizes that characteristic in the series circuit of photocells. Therefore, in order to obtain the output signal responsive to the light reflected from the photographic object, two photocells 158, 160 are related and constructed so that photocurrent generated by photocell 160 receiving the light reflected from the photographic object is smaller than photocurrent generated by another photocell 158 on receiving the light emitted from flash device 130. In this manner, photocurrent flows through the series circuit of the photocells in accordance with the light reflected from the photographic object while flash device 130 emits light. When flash device 130 does not emit light, because photocell 158, set in the flash housing and shut off from native light receives only the light from flash device 130, photocurrent flowing through the series circuit of the photocells is determined by the least of the photocurrents generated in both photocells, even though native light or other flash light is incident on photocell 160. That is, photocurrent flowing though the series circuit is determined by photocell 158. Therefore photocurrent is zero in this case and only leakage current not depending on light flows. Integrating capacitor 162 is charged with the photocurrent through said series circuit of the photocells and integrates the photocurrent. As mentioned above, because said photocurrent is generated by photocell 160 in accordance with the light reflected from the photographic object, the charged voltage of integrating capacitor 162 corresponds with the quantity of light reflected from the photographic object. Further resistor 170 connected in parallel with capacitor 162 discharges the charge on capacitor 162, and the time constant of resistor 170 and capacitor 162 is set to be much greater than the flash duration of the flash device, practically greater than 5mm second.

The setting of the movable contact of potentiometer 164 determines the trigger level of SCR 156. Switch 166 in its closed position short circuits photocell device 160, which is responsive only to the light reflected from the object.

Capacitor 162 is charged with photocurrent generated by photocell 158 responsive to illumination from flash device 130 when switch 166 connected in parallel with photocell 160 closes. In this case, the flash device is able to correctly flash optional quantity of light responsive to the predetermined trigger level, being not concerned with the light reflected from the photographic object, if the trigger level is predetermined by potentiometer 164. That is, the quantity of flash light is able to be controlled manually. In the open position of switch 166 as shown in FIG. 5, light measuring circuit C4 generates a signal for initiating the quenching of flash tube 130 in accordance with the light reflected from the photographic object. However, in accordance with another important feature of the invention, photocell device 160 is not connected to power source 168 until photocell device 158 is made conductive in response to the firing of flash tube 130. Thus, photocell device 158 functions as a gate device to ensure that the light measurement is made only in response to illuminations of the photographic object by flash tube 130. Resistor 170 discharges the charge on integrating capacitor 162, and the R-C time constant of resistor 170 and integrating capacitor 162 is set to be much greater than the flash duration of flash tube 130. Low voltage potential source 166 provides excitation for light measuring circuit C4 in accordance with known techniques for energizing photocell devices.

Low voltage potential source 168 of FIG. 5 may be replaced by using the power source of a strobe unit associated with the flash attachment of the camera. Also, as shown in FIG. 6, the low voltage potential source may comprise capacitor 172 connected in parallel with zener diode 174, with the parallel combination connected across main capacitor 132 as illustrated.

Figure 6:
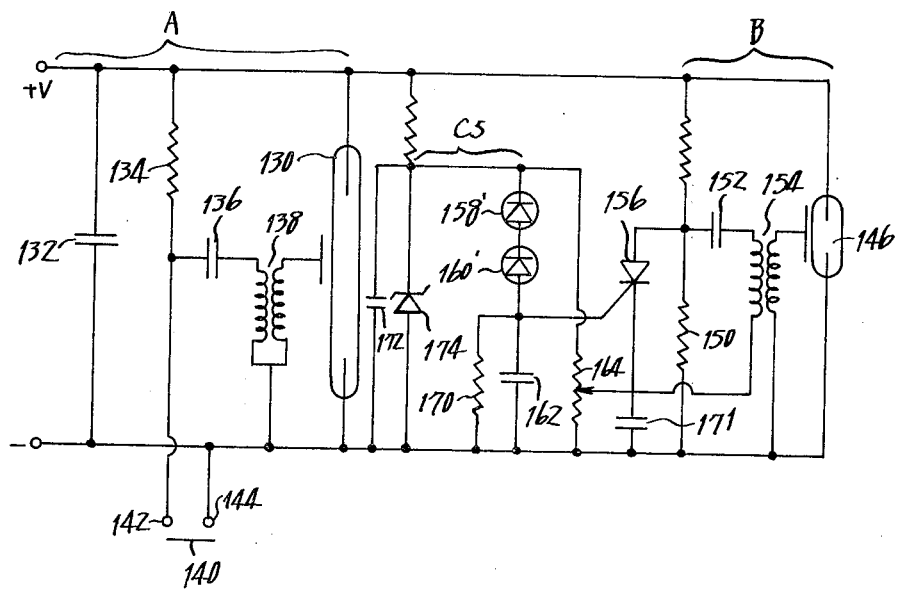
FIG. 6 is a modification of the embodiment of FIG. 5.

In the modified embodiment shown in FIG. 6, flash trigger circuit A4 and light terminating circuit B4 are identical to that shown in FIG. 5. In FIG. 6 photocell devices 158, 160 in light measuring circuit C5 consist of phototransistors 158', 160'.

The operation of light measuring circuit C4 in FIG. 5 and light measuring circuit C5 in FIG. 6 is initiated by the closing of switch 140(X-contacts 142, 144 are mounted on the camera) in synchronism with the camera shutter opening operation, enabling flash tube 130 to be fired by the well-known operation of flash trigger circuit A4. When flash tube 130 is fired, then coincidentally therewith photocell element 158 receives the light directly from flash tube 130. Photocell device 160 receives the light being reflected from the photographic object. The photocurrent generated by photocell element 160 is less than that generated by photocell device 158 as the light intensity received by photocell device 158 is greater than that received by photocell device 160. Because of the series connection of the two photocell devices, integrating capacitor 162 is charged with the photocurrent from photocell 160, thus enabling light measurement in accordance with the light reflected from the photographic object. However, when flash tube 130 is fired, photocell device 158 is coincidentally energized therewith, thereby enabling photocurrent to be generated by photocell device 160. Thus photocell device 158 functions as a single gate element to prevent operation of light measurement circuit C4 (or C5 in FIG. 6) in response to spurious light. Thus, even if light from the flash tubes of other cameras is incident on photocell device 160, photocell device 158 will not be fired, unless flash tube 130 is actuated by operation of the shutter mechanism of the camera. As a result, integrating capacitor 162 will not be charged, and light terminating circuit B4 will not be actuated by actuation of SCR 156 unless X-contact switch 140 is closed by the operator of the camera.

As is clear from the foregoing, the aforedescribed automatic control device for controlling the quantity of the light from a flash tube is positively actuated by closure of switch 140 to cause photocell device 158 to be directly energized by the light from flash tube 130, and enables photocell device 158 to begin generating photocurrent in response to the light reflected from the photographic object. When the voltage of integrating capacitor 162 reaches a given level, which has been set by means of the sliding contact of potentiometer 164 (the sliding contact is moved, for example, in accordance with the distance of the object) SCR 156 will be turned on, so that by-pass tube 146 will be fired to terminate the operation of flash tube 130. Capacitor 171 is charged to the level of voltage determined by the position of the sliding contact of potentiometer 164 to establish the control voltage between the gate and cathode of SCR 156.

I claim:
1. Automatic control apparatus for controlling the quantity of light from a flash device, comprising:
   means for generating light for illumination of a photographic object and including said flash device;
   light measuring means comprising a first photocell device responsive to the light from said flash device, a second photocell device serially connected with said first photocell device and responsive to light reflected from the photographic object, means for integrating the output of photocurrent flowing through series circuit of said first and second photocell, and means for energizing said first and second photocell devices; and
   means for preventing the light generated by said flash device from reaching said photographic object at the end of a time interval beginning with the energization of said flash device and ending when a given signal level is attained by said means for integrating.

2. Automatic control apparatus as in claim 1 wherein said light measuring means further includes means for removing the integrated signal of said means for integrating subsequent to the operation of said means for preventing.

3. Automatic control apparatus as in claim 2 wherein said means for integrating is a capacitor and said means for removing is a resistor parallelly connected thereto, the time constant of said resistor and capacitor being greater than the flash duration of said flash device.

4. Automatic control apparatus as in claim 3 further comprising switching means responsive to the level of the integrated signal of said capacitor for generating a signal to actuate said means for preventing.

5. Automatic control apparatus as in claim 4 further comprising means for varying the signal level at which said switching means is responsive to the integrated voltage of said capacitor.

6. Automatic control apparatus as in claim 5 wherein said switching means is a three electrode semiconductor device including a gate, cathode and an anode, said gate being connected to said capacitor, said anode being connected to said means for generating light, and said cathode and gate being connected to said means for varying the signal level.

7. Automatic control apparatus as in claim 1 for a camera wherein said light measuring means further includes second switching means parallelly connected to said second photocell device, said second switching means being closed by manual operation.

8. Automatic control apparatus as in claim 1 wherein said first photocell device is responsive only to the light from said flash device, and said second photocell device is responsive only to light reflected from the photographic object.

9. Automatic control apparatus as in claim 1 wherein said means for generating light includes means for energizing said flash device, and being connected to said means for energizing said first and second photocell devices and said latter-mentioned means for energizing includes means for regulating the voltage output from said first-mentioned means for energizing.

10. Automatic control apparatus as in claim 9 wherein said first and second photocell devices are phototransistors.

11. Automatic control apparatus as in claim 9 wherein said first and second photocell devices are photodiodes.

12. Light responsive apparatus for measuring the light emitted from a flash device and reflected from a photographic object and generating a signal representative thereof, comprising:
- a first photocell device responsive to the light from said flash device;
- a second photocell device responsive to the light reflected from said photographic object and serially connected to said first photocell device;
- means for integrating the output of photo-current flowing through series circuit of said first and second photocell; and
- means for energizing said first and second photocell devices.

13. Light responsive apparatus as in claim 12 further comprising means for removing the integrated signal of said means for integrating subsequent to the generation of said signal.

14. Light responsive apparatus as in claim 13 wherein said means for integrating is a capacitor and said means for removing is a resistor parallelly connected thereto, the time constant of said resistor and capacitor being greater than the time required by said light responsive apparatus to generate said signal.

15. Light responsive apparatus as in claim 12 for a camera and further comprising switch means parallelly connected to said second photocell device, said switch means being closed by manual operation.

16. Light responsive apparatus as in claim 12 wherein said first photocell device is responsive only to the light from said flash device, and said second photocell device is responsive only to light reflected from the photographic object.

17. Light responsive apparatus as in claim 12 wherein said first and second photocell devices are phototransistors.

18. Light responsive apparatus as in claim 12 wherein said first and second photocell devices are photodiodes.

* * * * *